United States Patent [19]

Wright et al.

[11] 4,162,892

[45] Jul. 31, 1979

[54] METHOD OF MANUFACTURING CONTINUOUS COIL SLIDE FASTENERS

[75] Inventors: William R. Wright, Warren; Theodore Murphy, Monson; Kenneth Piazzo, West Warren; August Leal, Monson, all of Mass.

[73] Assignee: Wm. E. Wright Co., West Warren, Mass.

[21] Appl. No.: 858,071

[22] Filed: Dec. 6, 1977

[51] Int. Cl.² ........................... D06P 3/00; D06P 5/00
[52] U.S. Cl. ................................................ 8/4; 8/179; 24/205.13 C; 264/78; 264/281; 264/DIG. 40
[58] Field of Search ......... 8/4; 264/78, 281, DIG. 40; 24/205.13 C

[56] References Cited
U.S. PATENT DOCUMENTS

| | | | |
|---|---|---|---|
| 2,334,000 | 11/1943 | Hamm | 8/150 |
| 3,137,036 | 6/1964 | Bashover et al. | 264/281 |
| 3,170,014 | 2/1965 | Burbank | 264/281 |
| 3,199,162 | 8/1965 | Sohr et al. | 24/205.13 |
| 3,431,337 | 3/1969 | Heimberger | 264/281 |
| 3,768,967 | 10/1973 | Sohr et al. | 8/149.1 |
| 3,908,242 | 9/1975 | Reynolds | 24/205.13 C |
| 3,939,547 | 2/1976 | Bernier et al. | 8/4 |
| 3,984,600 | 10/1976 | Kawase et al. | 24/205.13 C |

OTHER PUBLICATIONS

Moncrieff, R. W., "Man-Made Fibres" (John Wiley), 1975, pp. 455-456.

Primary Examiner—A. Lionel Clingman
Attorney, Agent, or Firm—Chapin, Neal & Dempsey

[57] ABSTRACT

Continuous method of manufacturing coil type slide fasteners by forming synthetic monofilaments into a pair of uncured fastener element coils. The fastener coils are then intermeshed in coupled relation and sewn onto the adjacent edges of a pair of uncured knit tapes. The coil, sewing thread and knit tapes are each composed of the same thermosetting resin. The fastener chain is advanced at uniform tension and velocity through a pressing stage and viscous dye bath containing a dispersion type thermosoling dye. The advancing chain is then vacuumed to provide uniform deposition of the dye on the tape and coil. The chain is then dried and led through a heating zone maintained at a temperature which simultaneously fixes the dyestuffs and cures or thermosets the coil and knit tapes. Thereafter, the moving chain is washed and calendered while being maintained under tension. The continuous zipper chain is then cut to length and supplied with a slider and end stops.

10 Claims, 9 Drawing Figures

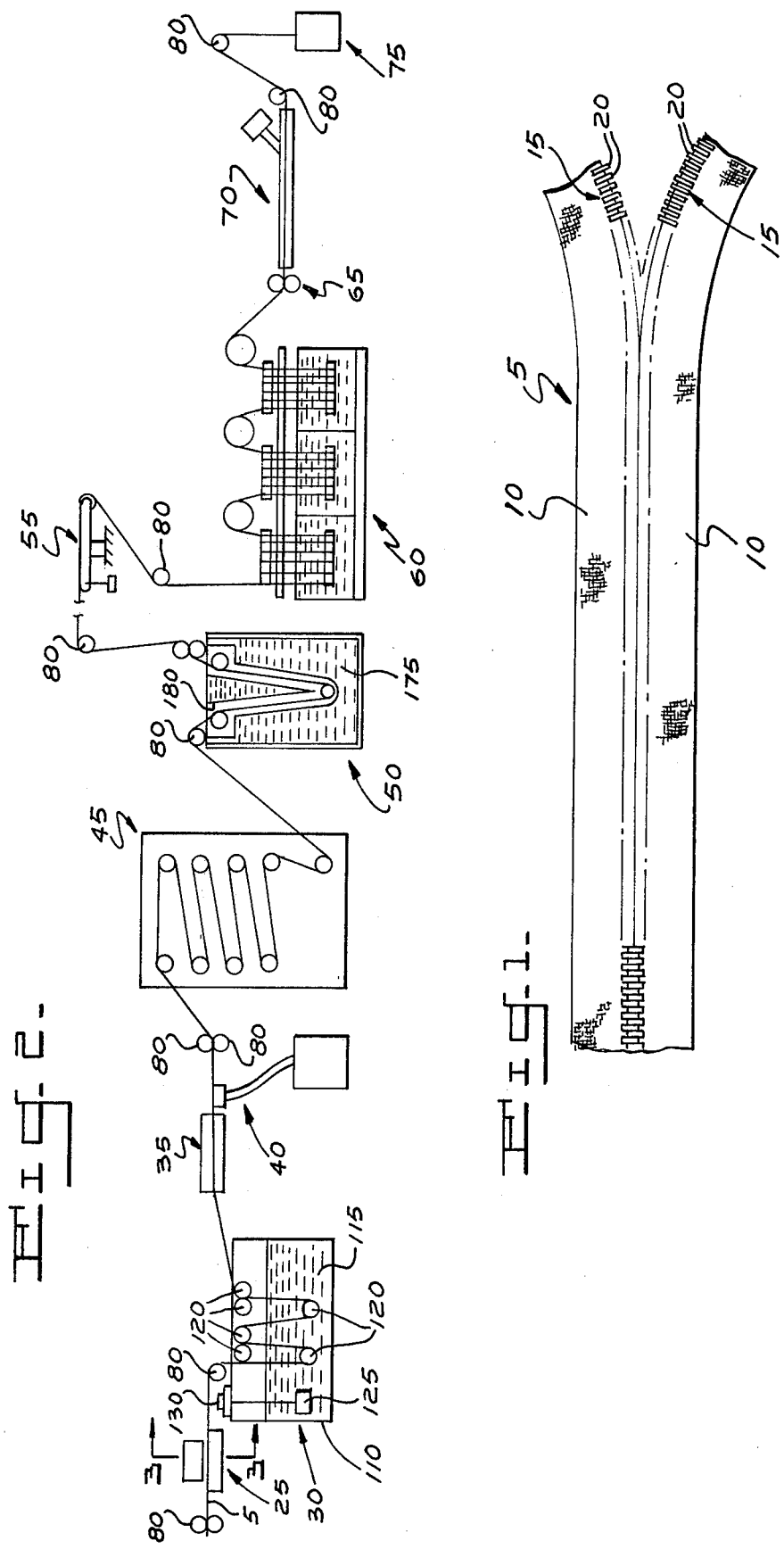

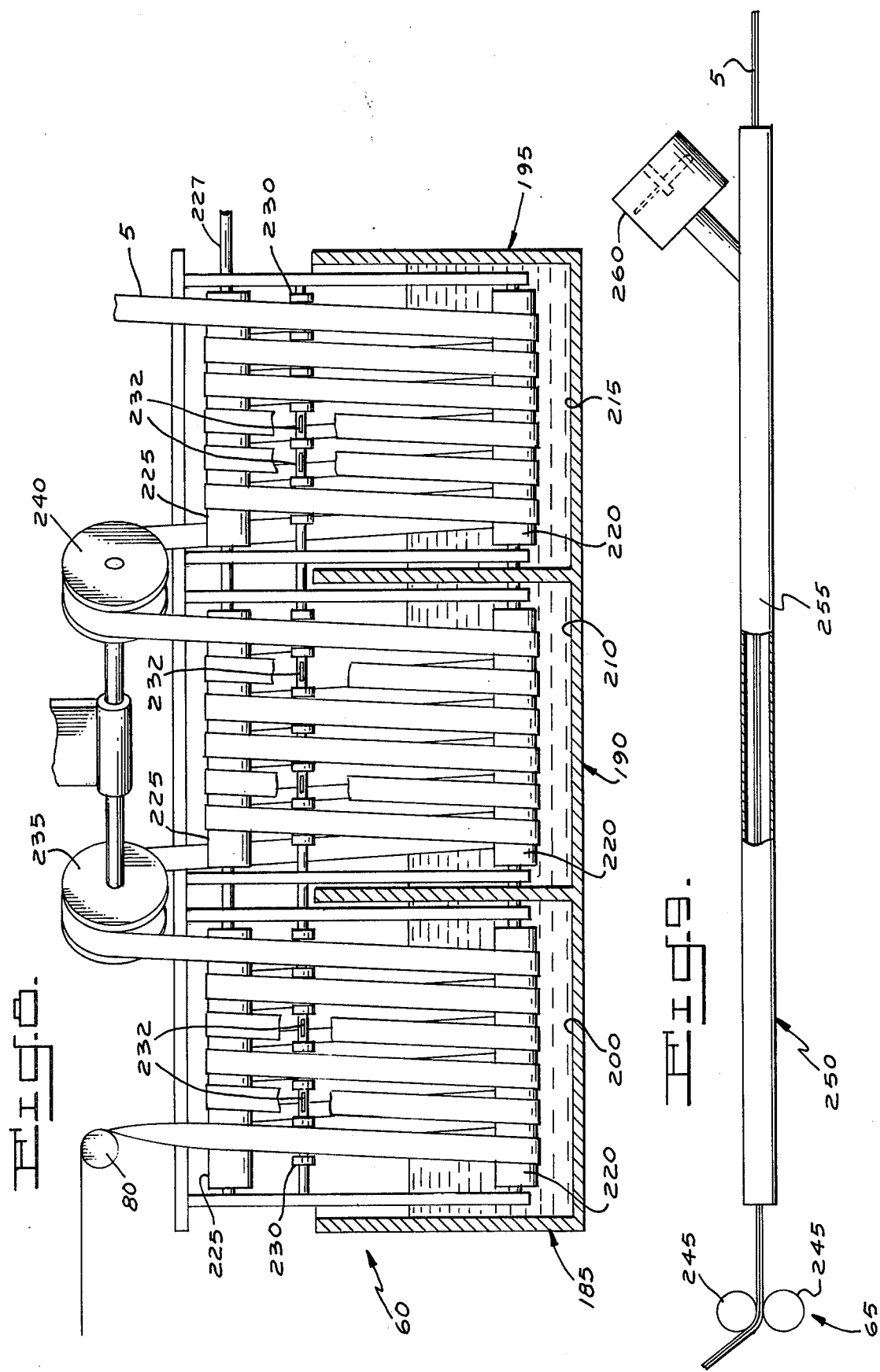

METHOD OF MANUFACTURING CONTINUOUS COIL SLIDE FASTENERS

BACKGROUND

This invention relates to a continuous method of manufacturing a coil type slide fastener chain which when cut to length and provided with sliders and stops produces modern type zippers.

Coil type slide fasteners have heretofore been manufactured by initially hot forming or thermosetting synthetic plastic monofilaments to their coil or helical configuration. These heat treated coils may then be coupled together and affixed to the edges of fabric tapes, providing a continuous length slide fastener chain which is collected by loosely coiling for further processing. Invariably, dyeing of the fastener chain is accomplished by batch processing, known as package or skein dyeing. Unfortunately, these prior processes frequently result in fasteners which have a relatively high failure rate and the coils have a tendency to pop open when folded or stressed. It has been found that one of the major factors contributing to this tendency is the excessive brittleness of the monofilament coils which results from multiple exposure of the coils to excessively high processing temperatures. In this connection, the filaments are subjected to elevated temperature during the coiling state, such as when the monofilament is wound around a heated mandrel or on a mandrel disposed in heated zone. High temperature on the order of 180°-200° F. have been used to insure that the coil will remain in its helical configuration so that the pairs of coils can be interlocked and sewn onto the fabric tapes. Subsequently, the coil and tapes are again subjected to high temperatures during final thermofixing of the coil and again during batch dyeing, scouring and calendering. On each occasion there is apparently a partial advance of the cure of the thermosetting resin which forms the coil. It will be realized that such heat treatment causes changes in the molecular structure of the material and thus tends to make it excessively rigid or brittle and also adversely affects its receptivity to dye stuffs.

This alteration in the dye receptivity of monofilament coils manifests itself in the zipper product which has been manufactured by the processes heretofore available. After skein or batch dyeing of such zipper chain, one finds that the coil and fabric are generally not uniform in shade. Frequently the tapes are streaky or blotchy and usually have a deeper shade of color than the coil and zippers of this appearance are not commercially acceptable to discriminating consumers.

Accordingly, it is a principal object of the present invention to provide a continuous process for manufacturing coil type slide fasteners which overcomes the deficiencies of the prior art.

It is another object of this invention to provide a process for manufacturing coil type slide fasteners which produces fasteners of uniform quality both from the operational and appearance standpoints.

It is a further object of this invention to provide a process for the manufacture of slide fasteners of the above type in which the quality of the product can be continuously monitored and controlled to obtain uniform product quality.

SUMMARY OF THE INVENTION

These and other objects of this invention will become more apparent from the following detailed description taken in connection with the accompanying drawings wherein there is disclosed a process of manufacturing slide fasteners. The process comprises the steps of forming a pair of fastener coils from a monofilament of heat settable synthetic plastic such as polyester. The coil is formed at a mild or moderate temperature. The coils are thereafter coupled together and sewn onto fabric tapes composed of the same synthetic plastic as the coil. The fastener chain which consists of the coil and fabric tapes is maintained at a selected tension and advanced at a given velocity throughout the remainder of the process wherein the fabrication of the chain, including its dyeing and thermosetting, is accomplished without interruption. If for any reason the shade or color of the continuously moving chain is unsuitable, its velocity through previous processing steps can be modified to obtain optimum product quality.

DESCRIPTION OF THE DRAWINGS

FIG. 1 is a plan view of a typical slide fastener chain treated by the process of the present invention;

FIG. 2 is a schematic representation of the slide fastener manufacturing process of the present invention;

FIG. 8 is an elevational view of a scouring and rinsing apparatus employed in the process of the present invention; and FIG. 9 is an elevational view partly in section of a dryer employed in the process of the present invention.

DESCRIPTION OF THE PREFERRED EMBODIMENT

Figure 3:
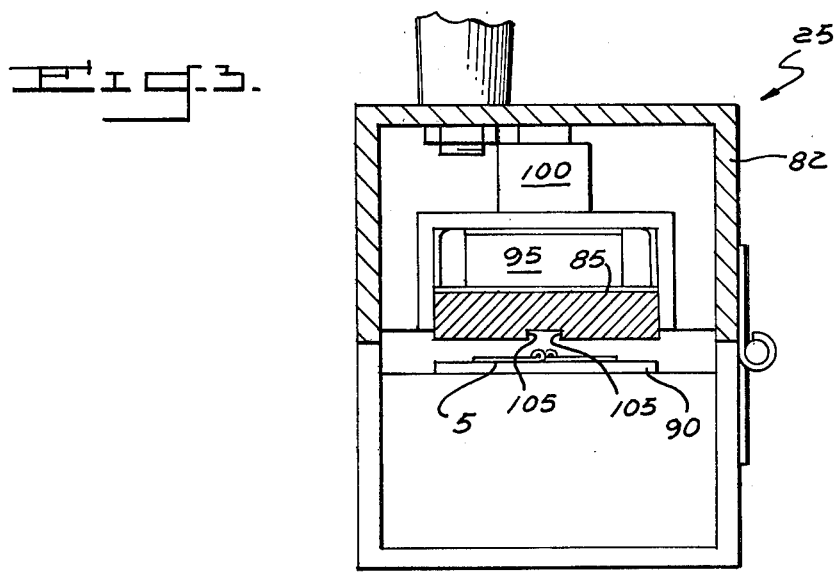
FIG. 3 is a sectional view taken along line 3—3 in FIG. 1.

Referring to FIG. 1, there is shown a sliding clasp fastener chain 5 manufactured in accordance with the present invention and comprising a pair of fabric tapes 10, each having a helical coil element 15 secured along the edge thereof as by sewing. The tapes may be a woven or knitted fabric of thermosetting synthetic plastic fibers, such as a polyester. Each coil is formed from a continuous length of heat settable monofilament material, preferably a polyester resin, the same as the tape. The polyester monofilament is wound about a suitable mandrel and shaped to provide a multiplicity of longitudinally spaced interlocking coils 20, such as shown in U.S. Pat. No. 3,199,162 to Sohr et al.

In accordance with the present invention the fastener coil or helix is formed by winding a synthetic monofilament about a mandrel in the manner such as disclosed in the aforementioned patent to Sohr et al. During the forming operation, the coil is heated by a suitable heating source to a temperature in the range of 135° to 145° F. This is a relatively mild or moderate temperature which facilitates formation of the coil and imparts sufficient form stability to the monofilament coil but without deleterious thermal effect on the polyester resin of which the coil is formed. A pair of monofilament coils are then coupled together and sewn onto the adjacent edges of a pair of fabric tapes to form a fastener chain which is constituted of the tapes and pair of intermeshed coils, as shown in FIG. 1. Ultimately this continuous chain will be cut to length and provided with end stops and sliders to form large numbers of slide fasteners. The remainder of the processing steps embodying this invention including dyeing, thermofixing, washing and calendering are carried out as a continuous uninterrupted process in which the fastener chain is kept under controlled tension throughout the fabricating processes whereby uncoiling of the helix and wrinkling of the fabric tapes is avoided.

To produce a sliding clasp fastener chain having proper structural and operating characteristics as well as a soft hand and uniform color and shade, the chain is processed, as schematically illustrated in FIG. 2. As will be described, the chain is advanced under controlled tension and velocity through the various treatment stations by any suitable means, such as an electric drive motor (not shown). The fastener chain is first led through an ironing or pressing apparatus as illustrated at 25 for removal of wrinkles or creases and thereafter through a liquid dye bath 30 and then through a dye leveler 35 which uniformly distributes the dye over the coil and tapes. A vacuum device 40 then removes excess dye and recirculates it back to the dye bath vat. The chain is dried in dryer 45 and drawn through a heating chamber 50 maintained at a temperature in the range of 390° to 400° F., which is the curing or setting temperature of the polyester coil and fabric and the fixing temperature of the dyestuffs. The chain is then drawn over a central balance tensioning device 55 which maintains the chain uniformly tensioned throughout the process embodying this invention. The chain is then advanced through a scouring and rinsing apparatus 60 wherein the chain is cleaned, rinsed and treated with a finishing agent. Calendering by rollers 65 and drying in tube 70 completes the processing. Calender rollers 65 and dryer 70 cooperate to smooth and dry the chain while controlling the tension thereof. Finally, the chain is collected at 75 for final cutting and assembly with suitable end stops and a slider mechanism. As illustrated in FIG. 2, various rollers 80 are employed to direct the chain to the apparatus noted hereinabove and may at the same time be employed to connect the chain to the drive means and control the tension within the chain. Such rollers are well known in the field of textile web processing.

Referring to FIG. 3, ironing device 25 presses the tapes 10 before the dyeing thereof, thereby preventing irregularities in color shading due to collection of excess dye in any wrinkles or creases existing in the tape. Ironing device 25 comprises a housing 82 enclosing upper and lower heat transfer plates 85 and 90, respectively. The heat transfer plates are electrically heated by thermostatically controlled electric heating elements. By way of example, the heating element for upper plate 85 is shown at 95 and the thermostatic control therefor is shown at 100. A similar heating element and thermostatic control (not shown) are provided for lower plate 90. As the chain is drawn through the ironing device, it is supported on lower plate 90, upper plate 85 being spaced therefrom and grooved with a channel 105 to accommodate the cross section of the coil. In the preferred embodiment wherein the tapes and stringers are formed from a polyester, the lower plate is maintained at a temperature of approximately 180° F., while the upper plate, due to its spacing from the chain, may be maintained at a higher temperature of 320° F. Temperature in the range of 160° to 250° F. has been found effective to remove wrinkles from the tapes without thermosetting or curing of the tape or coil owing to the continuous rate of movement of the chain through the ironing device.

The chain is next advanced through dye bath 30 comprising a dye vat 110 containing a reservoir of suitable dye 115 (see FIG. 2). This continuous dyeing operation allows constant monitoring of the chain color and if necessary immediate adjustment of the operating parameters, such as chain speed through the dye bath and/or dye composition. Such immediate and continuous control is not possible in prior art batch or skein dyeing processes wherein such monitoring of the dyeing process is impossible. The dye is preferably maintained at room temperature to avoid any deleterious thermal effects on the chain. The dye used consists essentially of a combination of a dispersion dyestuff, thickener, and an anionic surfactant. The aqueous dye bath consists by weight of about 85% to 90% of a dispersion of dyestuffs, 10% to 15% carboxymethyl cellulose (CMC) thickener and 0.1% of a suitable anionic surfactant, such as Permalene A-120. Significantly, it will be noted that the dye bath used in carrying out this invention is composed of an unusually large percentage of thickener, i.e., 10% to 15% as compared to conventional disperse dyes which contain only 1.5% to 3% thickener. The dye is made up from high energy dyestuffs and a premixed concentrated solution of 72 grams of dry CMC powder dispersed in each quart of water. The thickener is allowed to hydrate to form a smooth gel, and when mixed with the dye, relatively large quantities of dyestuffs are absorbed in the thickener whereby the dyestuffs are carried onto the fastener chain and particularly the monofilament coil as a uniform film or layer.

The chain 5 makes four passes through the dye bath being led over tension rollers 120. To prevent any of the dye components from settling out, the dye is agitated by a stirrer 125 powered by suitable drive means such as electric motor 130.

Since the tapes 10 are preferably knit from unset polyester yarn, they are often contaminated with an oil used as a lubricant in the knitting of the yarn. Usually, it is necessary to cleanse the tapes to remove such oil residues prior to dyeing, otherwise the color shade and hue are not uniform and true. In the method of the present invention, however, uniformity of color and shaft are achieved without such a preliminary cleaning step. It is believed that in the present method, the anionic surfactant used in the dyeing solution causes the oil to be washed from the tapes, thereby providing a clean surface for adhesion of the dyestuffs. It is further believed that any oil remaining on the tapes after the dyeing thereof is either removed by the subsequent mechanical dye leveling or vaporized during the thermofixing step of the process.

Figure 4:
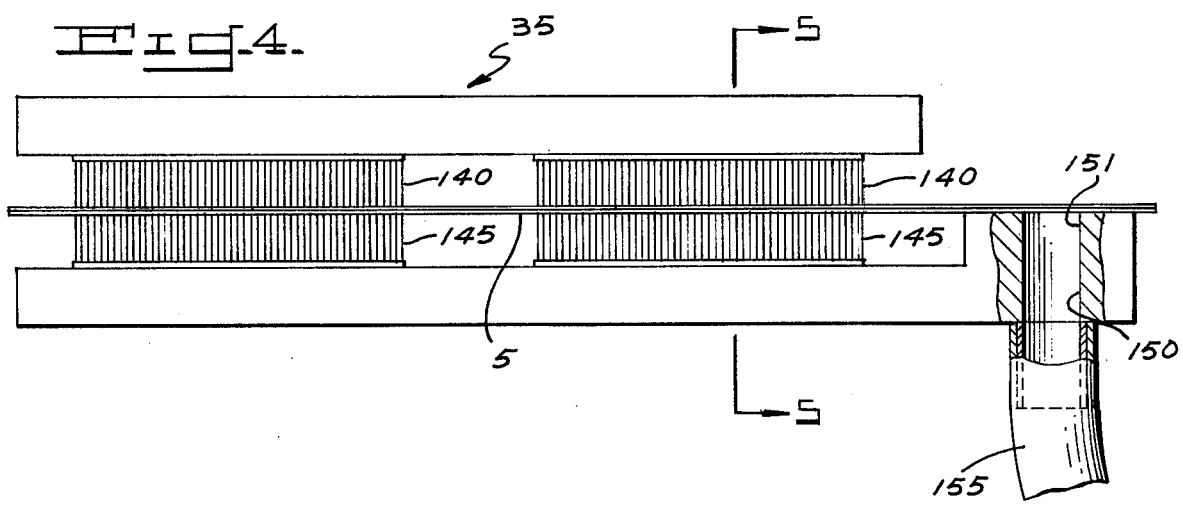
FIG. 4 is a side elevational view of a dye leveling and vacuum apparatus employed in the process of the present invention.
Figure 5:
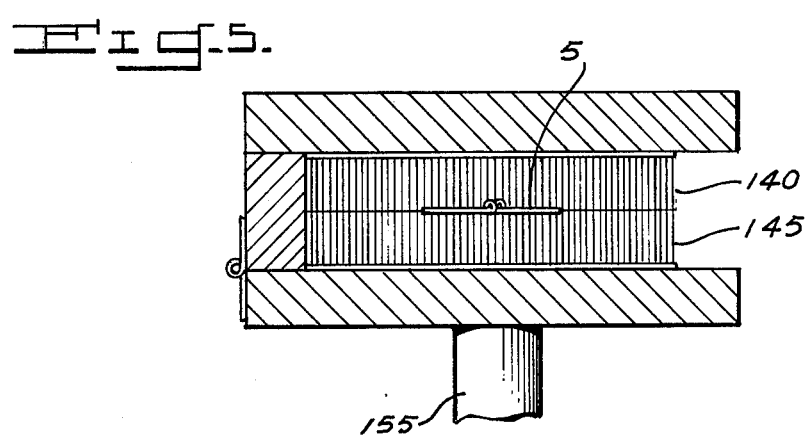
FIG. 5 is a sectional view taken along line 5—5 of FIG. 4.

Following the dyeing operation, the chain is led through the dye leveler 35 comprising one or more pairs of opposed upper and lower brush pads 140 and 145 (FIGS. 4 and 5) which uniformly distribute the dye over the irregular surfaces of the knit tapes and coil elements and into the interstices of these elements. Excess dye is then removed from the chain by passing the tensioned chain over vacuum device 40 including a suction head 150 which terminates at an orifice or port 151 over which the tape is drawn. Any excess dye so removed is returned by conduit 155 to dye vat 110 for reuse. Because of the relatively viscous nature of the dispersion dye, a uniform film or layer of thickener containing dyestuffs is applied to the fastener chain including the monofilament coil.

Figure 6:
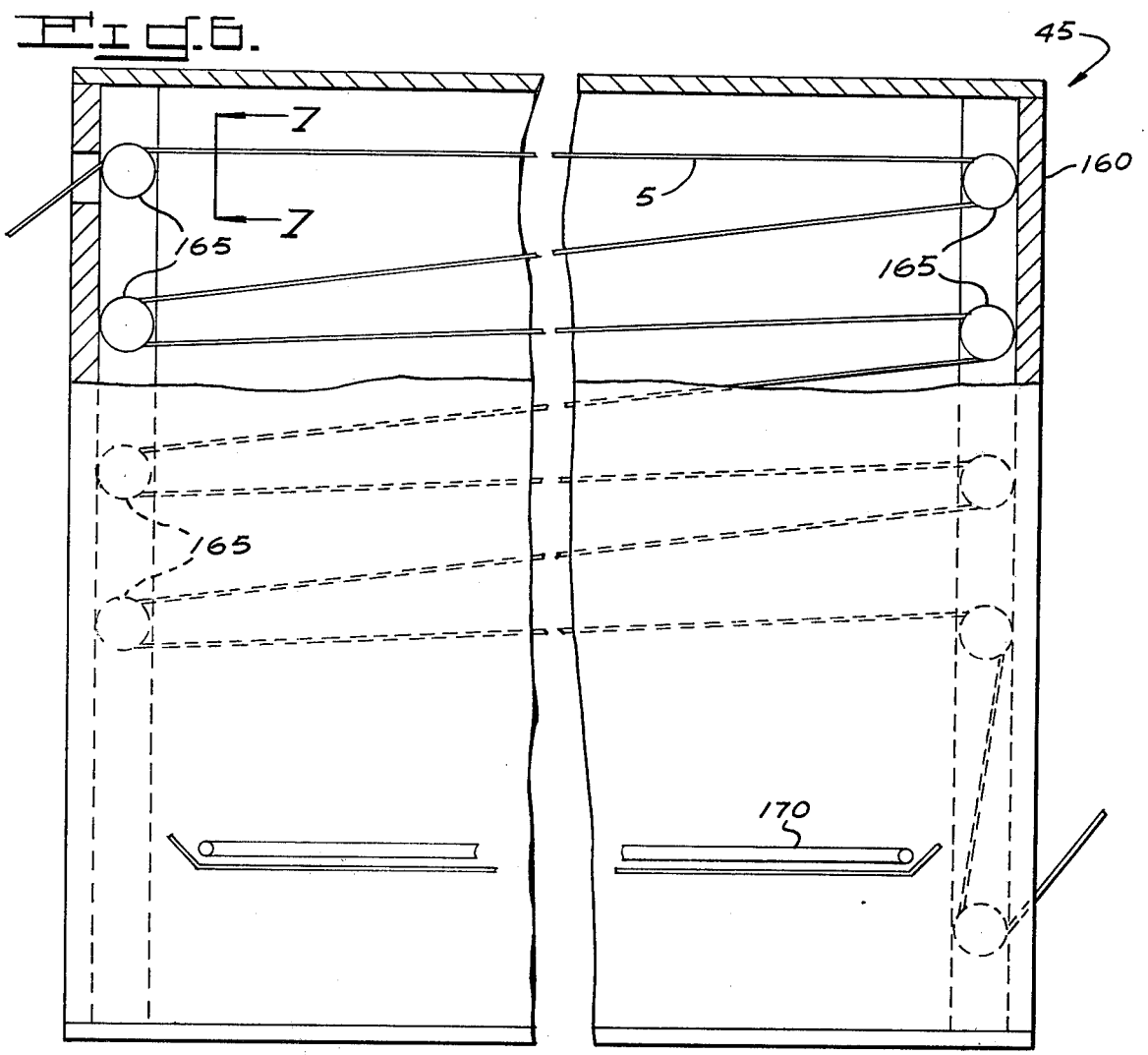
FIG. 6 is an elevational view, partly in section of a drying apparatus employed in the process of the present invention.
Figure 7:
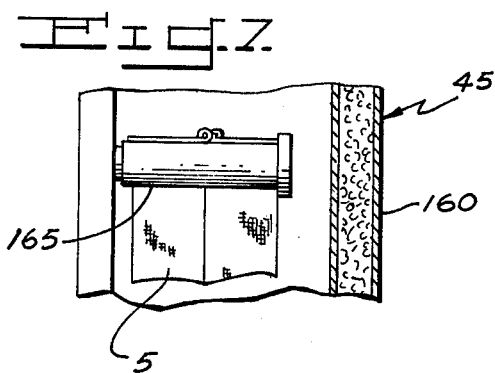
FIG. 7 is a sectional view taken along line 7—7 of FIG. 6.

After leveling the vacuuming, the chain is dried in air dryer 45. Referring to FIGS. 6 and 7, dryer 45 comprises an insulated housing 160 having opposed vertical rows of spaced rollers 165 mounted therein and a heating element 170 disposed adjacent the bottom thereof. The chain enters the dryer at the upper portion thereof, winds about rollers 165 in serpentine fashion toward the lower end and exits near the bottom thereof. As the chain is drawn through the dryer, it is dried at gradually increasing temperatures, ranging from approximately 155° F. at the top of the dryer adjacent the chain entrance to approximately 270° F. at the bottom of the dryer adjacent the heating element. This multi-pass dryer allows the chain to be thoroughly dried without exposure to very high temperatures which when repeated in the subsequent thermofixing operation would likely cause the chain to become brittle. In addition, this gradual drying of the chain avoids hot spots which during the subsequent thermofixing operation, could result in dyeing problems, such as irregular coloring and also shrinkage and weakening of the chain.

After drying is completed, the chain is led through a heater 50, wherein the chain material is thermoset and the dye simultaneously thermofixed. In the heater 50, the polyester resin components undergo controlled crosslinking reactions which cause the tapes and stringers to stabilize in shape while simultaneously the dye sublimates or vaporizes from the thickener and migrates into the expanding molecular structure of the polyester to provide a colorfast zipper chain. Such sublimation dyeing is known as "thermosoling." In the preferred embodiment, the temperature within heater 50 is maintained in the range of 380° F. to 420° F. by a bath 175 of liquid having a melting point slightly higher than the thermosetting and thermofixing temperatures. As disclosed in Sohr U.S. Pat. No. 3,768,967, the chain is received within a chamber or tubular conduit 80 in heat transfer relation to the bath, thereby preventing the direct contact of the chain with the bath solution. Since exposure to the thermosetting temperature within chamber 80 is the one and only time the chain is exposed to such elevated temperatures, the dye molecules will sublimate or vaporize from the thickener layer and penetrate the polyester molecule, ensuring permanent dyeing to a uniform color and shade throughout the chain components. Moreover, since the chain was not subjected to a number of wide temperature variations, the coil is found to have optimum physical properties both from the standpoint of appearance and functionality.

Following this simultaneous thermofixing and thermosoling operations, the chain is cleaned so as to remove the thickener layer and if required, treated with a finishing agent is a scouring and rinsing apparatus 60. Referring to FIG. 8, apparatus 60 comprises a serial arrangement of separate chambers 185, 190 and 195. The bath chambers or units are substantially identical, each includes a tank 200, 210 and 215, having a lower guide roller 220 disposed adjacent the bottom thereof. An upper guide roller 225 is disposed parallel to each lower roller, above the corresponding tank. The rollers 225 may be mounted on a common shaft 227 driven by any suitable means, not shown. As shown in FIG. 8, the slide fastener chain is looped in edge-to-edge relation around each pair of guide rollers in a helical fashion. The guide rollers serve to conform the chain into a plurality of adjacent loops, each partially immersed in the bath for sequential washing of the chain. An elongate vacuum manifold 230, provided with a longitudinal distribution of spaced ports 232 is disposed parallel to and between each pair of upper and lower guide rollers above the corresponding tank and serves to remove excess bath solution from the chain after each passage of the chain in the bath solution. First and second obliquely disposed rollers 235 and 240 guide the chain from tank 200 to tank 210 and from tank 210 to tank 215, respectively. It will be appreciated that the orientation of the tanks and rollers set forth hereinabove allows the chain to be repetitively immersed and treated in a tank of minimum liquid volue, thereby conserving the treatment solution employed. Moreover, the repetitive immersion of the chain within each of the tanks is achieved on a single driven shaft 227 and a single vacuum conduit 230, whereby the several vacuum heads are connected to one vacuum source. In addition, this edge-to-edge type orientation enables the use in compact units of relatively generous diameter guide rolls 220 and 225 so that the chain is not tightly or sharply bent during the washing phase.

Tank 200 contains a bath of a washing or scouring solution. In the preferred emodiment the chain is washed in an aqueous solution of approximately 50 grams per gallon of 50% liquid caustic soda and approximately 40 grams per gallon of sodium hydrosulfite maintained by suitable heaters (not shown) at a temperature of approximately 100°–120° F. After each pass through the tank, the chain is drawn over the vacuum manifold which removes much of the contaminated washing solution from the chain. After the chain is thoroughly washed in tank 200, it is guided into tank 210 for a multipass neutralizing rinse. In the preferred embodiment the neutralizing rinse comprises an aqueous solution of an acid salt, such as that marketed by Surpass Chemical Company under the mark "Sour XS." After each pass through the liquid in tank 210, the chain is drawn over the vacuum manifold which removes much of the contaminated neutralizing solution from the chain. Following the neutralizing rinse in tank 210, the chain is led into tank 215 where it is rinsed in either a pure water rinse or if required, a finishing agent for modification of the hand of the fastener. The vacuum manifold in tank 215 removes much of the final rinsing agent from the chain subsequent to each pass through the bath.

Following the final rinse, the chain is pressed by calender 65 comprising rollers 245 (FIG. 9) and immediately drawn through dryer 250 where it is uniformly and gradually dried. Dryer 250 comprises a tube housing 255 and a blow dryer 260 which injects heated air into the housing along the longitudinal axis of said chain. Preferably, the air blown into the tube is heated to about 300° F., such as by electrical heating elements, which provides the finishing step for the tensioned chain. The close proximity of the calendering and drying apparatus at controlled tension results in a chain of smooth wrinkle free appearance.

Subsequent to the final drying operation, the continuous chain may be cut to predetermined lengths and assembled with end stops and sliders to complete the zipper manufacture.

It will be appreciated that the process of the present invention overcomes many of the deficiencies of prior art slide fastener manufacturing processes. Thus the continuous nature of the process minimizes large temperature variations or cycles inherent in prior batch type processes and enables monitoring of the appearance, hand and functionality of the polyester chain at each stage of its fabrication thereby providing for continuous control and adjustment of chain velocity and processing parameters in the various treatment apparatus. For example, uniformity of shade and color intensity is ensured by controlling the dwell time of the polyester chain in the dye bath and/or in the thermofixing unit. Moreover, since the simultaneous thermosetting of the chain and thermofixing of the dye takes place immediately after the dyed chain is hot air dried in a heating chamber, the chain will remain at an elevated temperature when entering the thermofixing unit and thus not be subject to the wide temperature fluctuations of the prior art. This process thus ensures color fast dyeing with uniformity of shade between the web and stringers and minimizes the incidence of defects in the mechanical properties of the coil caused by thermal cycling of the polyester material. In the event some undesirable property is observed during fabrication, a corrective measure can be promptly taken with minimum waste in terms of defective product. This was not feasible with previous manufacturing processes which involved batch treatment of the fastener chain. Thus, for example, if a batch had not been properly dyed, it would not have been realized until the product was examined after the dyeing had been completed. Of course, by that time a large quantity of defective product would have been produced and could not likely be reclaimed, thus resulting in tremendous waste and inefficiency.

Having thus described the invention, what is claimed is:

1. Method of manufacturing coil type slide fasteners comprising the steps of forming a pair of slide fastener coils from polyester monofilament material at a moderate temperature to facilitate coil forming, intermeshing said coils and securing the same along adjacent edges of a pair of fabric webs formed of yarn of the same material as the coils, whereby a continuous length of slide fastener chain is formed; continuously moving said chain in tensioned condition while performing the following sequential treatments; applying to said chain a thermosoling liquid dispersion dye in solution with a thickener in a sufficient quantity to promote application of a uniform film of the dispersion dye on said fastener coils; subjecting the material forming said chain for the first time to a temperature in the range of 380°–420° F. which is substantially higher than the coil forming temperature for simultaneously thermosetting said polyester and thermosoling said dispersion dye whereby said dye in its solid phase sublimates and its vapor penetrates the molecular structure of said polyester to effect color fast dyeing of the chain and then washing said chain to remove said thickener.

2. Method of manufacturing coil type slide fasteners as set forth in claim 1 in which a uniform layer of said dye is obtained by advancing said chain in tensioned condition over a vacuum port and in which after washing said chain it is dried in an elongated chamber in which an unsupported span of moving chain is tensioned whereby a crease and wrinkle free finish is obtained.

3. Method of manufacturing coil type slide fasteners as set forth in claim 1 wherein said dispersion dye is applied to said fastener chain at room temperature and said thermosetting and thermosoling are carried out at a temperature within the range of 380° F. and 420° F.

4. Method of manufacturing polyester coil type slide fasteners as set forth in claim 1 wherein said fabric webs are knitted; said dispersion dye comprising a solution of high energy disperse dyestuffs, 10% to 15% by weight of a thickener and an anionic surfactant.

5. Method of manufacturing coil type slide fasteners as set forth in claim 1 wherein subsequent to its dyeing, said chain is moved through leveling means and then advanced in tensioned condition over a vacuum port whereby the dye is uniformly distributed over the coils and fabric webs forming said chain.

6. Method of manufacturing coil type slide fasteners as set forth in claim 4 wherein said thickener is carboxymethyl cellulose.

7. Method of manufacturing coil type slide fasteners as set forth in claim 6 in which the drying of said chain after dyeing is carried out in tensioned condition in a chamber heated to a temperature within the range of 155° F. to 175° F., a layer of thickener containing dye in its solid phase remaining on said chain after said drying.

8. Method of manufacturing coil type slide fasteners as set forth in claim 7 wherein after dyeing, said chain is advanced under tension through leveling means and over a vacuum port for uniformly distributing the dye over the surfaces of said chain, said chain being washed after the thermosoling of said dye to remove said thickener therefrom by multiple immersion and withdrawal from a washing solution, said chain being moved under tension over a vacuum orifice subsequent to each immersion in the washing solution for removing the excess washing solution and thickener from said chain.

9. Method of manufacturing coil type slide fasteners as set forth in claim 8 wherein the washing of the chain after thermosoling is carried out in a multi-chamber washing apparatus having spaced parallel upper and lower rollers disposed therein adapted to support and advance said fastener chain in helical form looped in edge-to-edge relation about said rollers, the lower of said rollers being disposed below the surface of said washing solution and the upper roller being disposed above said surface and a vacuum conduit disposed intermediate said rollers and above the surface of said washing solution and being provided with spaced orifices so that after each loop of said chain is withdrawn from said solution it is led over one of said orifices.

10. Method of manufacturing coil type slide fasteners as set forth in claim 9 wherein subsequent to the washing thereof said chain is calendered and dried by a current of heated air in a tubular chamber while held in tensioned relation over an unsupported span extending substantially the length of said chamber.

* * * * *